US010145968B2

(12) United States Patent
Simpson et al.

(10) Patent No.: US 10,145,968 B2
(45) Date of Patent: Dec. 4, 2018

(54) LINEAR FITTING OF MULTI-THRESHOLD COUNTING DATA

(71) Applicant: PURDUE RESEARCH FOUNDATION, West Lafayette, IN (US)

(72) Inventors: Garth Jason Simpson, West Lafayette, IN (US); Ryan Douglas Muir, West Lafayette, IN (US); Nicholas Roman Pogranichniy, West Lafayette, IN (US)

(73) Assignee: PURDUE RESEARCH FOUNDATION, West Lafayette, IN (US)

( * ) Notice: Subject to any disclaimer, the term of this patent is extended or adjusted under 35 U.S.C. 154(b) by 404 days.

(21) Appl. No.: 14/708,335

(22) Filed: May 11, 2015

(65) Prior Publication Data

US 2015/0323687 A1    Nov. 12, 2015

Related U.S. Application Data

(60) Provisional application No. 61/992,197, filed on May 12, 2014.

(51) Int. Cl.
| | |
|---|---|
| G01T 1/36 | (2006.01) |
| G01T 1/24 | (2006.01) |
| G01T 1/17 | (2006.01) |

(52) U.S. Cl.
CPC ............... *G01T 1/24* (2013.01); *G01T 1/17* (2013.01); *G01T 1/36* (2013.01)

(58) Field of Classification Search
CPC ............... G01T 1/24; G01T 1/36; G01T 1/17
See application file for complete search history.

(56) References Cited

U.S. PATENT DOCUMENTS

| | | | | |
|---|---|---|---|---|
| 8,218,715 B2 * | 7/2012 | Sauer | ..................... | A61B 6/032 378/207 |
| 2002/0150209 A1 * | 10/2002 | Yokhin | ..................... | G01T 1/36 378/82 |

(Continued)

FOREIGN PATENT DOCUMENTS

JP    WO 2016129455 A1 *   8/2016   ............... G01T 1/17

OTHER PUBLICATIONS von Laue, M, Concerning the Detection of X-Ray Interferences. Nobel Lecture: 1915.

(Continued)

*Primary Examiner* — Laura Menz
(74) *Attorney, Agent, or Firm* — Purdue Research Foundation (57) ABSTRACT

The present disclosure provides a system and method for efficiently mining multi-threshold measurements acquired using photon counting pixel-array detectors for spectral imaging and diffraction analyses. Images of X-ray intensity as a function of X-ray energy were recorded on a 6 mega-pixel X-ray photon counting array detector through linear fitting of the measured counts recorded as a function of counting threshold. An analytical model is disclosed for describing the probability density of detected voltage, utilizing fractional photon counting to account for edge/corner effects from voltage plumes that spread across multiple pixels. Three-parameter fits to the model were independently performed for each pixel in the array for X-ray scattering images acquired for 13.5 keV and 15.0 keV X-ray energies. From the established pixel responses, multi-threshold composite images produced from the sum of 13.5 keV and 15.0 keV data can be analytically separated to recover the monochromatic images through simple linear fitting.

8 Claims, 6 Drawing Sheets

(56) References Cited

U.S. PATENT DOCUMENTS

| | | | | |
|---|---|---|---|---|
| 2006/0274401 | A1* | 12/2006 | Inoue | G02F 1/395 359/326 |
| 2008/0052024 | A1* | 2/2008 | Tracy | G01N 21/274 702/85 |
| 2010/0215230 | A1* | 8/2010 | Bornefalk | G06T 11/005 382/128 |
| 2012/0069952 | A1* | 3/2012 | Wu | A61B 6/032 378/5 |
| 2013/0040417 | A1* | 2/2013 | Janesick | H01L 27/14609 438/73 |
| 2013/0275054 | A1* | 10/2013 | Simpson | G01J 1/16 702/26 |
| 2014/0023993 | A1* | 1/2014 | Zeng | G02B 21/0052 433/215 |
| 2014/0110592 | A1* | 4/2014 | Nelson | G01T 1/1611 250/370.09 |
| 2015/0300965 | A1* | 10/2015 | Sezginer | G01N 23/201 378/86 |
| 2015/0323687 | A1* | 11/2015 | Simpson | G01T 1/24 702/190 |
| 2016/0070093 | A1* | 3/2016 | Simpson | G01N 15/1429 348/80 |
| 2016/0306056 | A1* | 10/2016 | Sun | G01T 7/005 |
| 2016/0310088 | A1* | 10/2016 | Kim | A61B 6/14 |
| 2016/0349192 | A1* | 12/2016 | Yamakawa | A61B 6/02 |
| 2017/0069085 | A1* | 3/2017 | Sakamoto | A61B 6/5294 |
| 2017/0071554 | A1* | 3/2017 | Fukuda | A61B 6/4452 |
| 2017/0119340 | A1* | 5/2017 | Nakai | A61B 6/585 |
| 2017/0125477 | A1* | 5/2017 | Yuan | H01L 27/14663 |
| 2017/0143290 | A1* | 5/2017 | Ranjan | G06T 7/337 |
| 2017/0196523 | A1* | 7/2017 | Hawver | A61B 6/4225 |
| 2017/0202532 | A1* | 7/2017 | Goto | A61B 6/5294 |
| 2017/0206682 | A1* | 7/2017 | Roessl | G06T 11/008 |
| 2017/0238887 | A1* | 8/2017 | Karim | A61B 6/4241 |
| 2017/0265822 | A1* | 9/2017 | Du | A61B 6/03 |
| 2017/0325773 | A1* | 11/2017 | Nishino | A61B 6/5258 |
| 2017/0345191 | A1* | 11/2017 | Koehler | G06T 5/002 |
| 2017/0374295 | A1* | 12/2017 | Topfer | H04N 5/32 |

OTHER PUBLICATIONS

Schlichting, I., et al., Time-Resolved X-Ray Crystallographic Study of the Conformational Change in HA-Ras P21 Protein on GTP Hydrolysis. Nature 1990, 345 (6273), 309-315.

Clifton, I., et al., Evaluation of Laue diffraction patterns. In Macromolecular Crystallography, Pt B, Carter, C. W.; Sweet, R. M., Eds. 1997; vol. 277, pp. 448-467.

Srajer, V., et al., Photolysis of the carbon monoxide complex of myoglobin: Nanosecond time-resolved crystallography. Science 1996, 274 (5293), 1726-1729.

Frojdh, C., et al., Spectral X-ray imaging with single photon processing detectors. Journal of Instrumentation 2013, 8, 1-9.

Nik, S., et al., Optimal material discrimination using spectral x-ray imaging. Physics in Medicine and Biology 2011, 56 (18), 5969-5983.

Jakubek, J., Data processing and image reconstruction methods for pixel detectors. Nuclear Instruments & Methods in Physics Research A, 2007, 576 (1), 223-234.

Roessl, E., et al., K-edge imaging in x-ray computed tomography using multi-bin photon counting detectors. Physics in Medicine and Biology 2007, 52 (15), 4679-4696.

Fredenberg, E.; et al., Energy resolution of a photon-counting silicon strip detector. Nuclear Instruments & Methods in Physics Research A, 2010, 613 (1), 156-162.

Boone, J. M., et al., Dual-Energy Mammography—A Detector Analysis, Medical Physics 1990, 17 (4), 665-675.

Butler, A. P. H., et al., Bio-medical X-ray imaging with spectroscopic pixel detectors. Nuclear Instruments & Methods in Physics Research A 2008, 591 (1), 141-146.

Procz, S., et al., Optimization of Medipix-2 Threshold Masks for Spectroscopic X-Ray Imaging. IEEE Transactions on Nuclear Science 2009, 56 (4), 1795-1799.

Liopart, X., et al., Medipix2: a 64-k pixel readout chip with 55 mu m square elements working in single photon counting mode. IEEE Transactions on Nuclear Science 2002, 49 (5), 2279-2283.

Ballabriga, R., et al., The medipix3 prototype, a pixel readout chip working in single photon counting mode with improved spectrometric performance. IEEE Transactions on Nuclear Science 2007, 54 (5), 1824-1829.

Broennimann, C.; et al., The PILATUS 1M detector. Journal of Synchrotron Radiation 2006, 13, 120-130.

Henrich, B.; et al., PILATUS: A single photon counting pixel detector for X-ray applications. Nuclear Instruments & Methods in Physics Research A 2009, 607 (1), 247-249.

Llopart, X., et al., Timepix, a 65k programmable pixel readout chip for arrival time, energy and/or photon counting measurements. Nuclear Instruments & Methods in Physics Research A, 2007, 581 (1-2), 485-494.

Kraft, P., et al., Characterization and Calibration of PILATUS Detectors. IEEEE Transactions on Nuclear Science 2009, 56 (3), 758-764.

Kissick, D., et al., Statistical Treatment of Photon/Electron Counting: Extending the Linear Dynamic Range from the Dark Count Rate to Saturation. Analytical Chemistry 2010, 82 (24), 10129-10134.

Julien, M., et al., Detective quantum efficiency model of single-X-ray-photon counting hybrid pixel detectors. Journal of Instrumentation 2012, 7 (11), P11028.

Trueb, P., et al., Improved count rate corrections for highest data quality with PILATUS detectors. Journal of Synchrotron Radiation 2012, 19, 347-351.

Mathieson, K.; et al., Charge sharing in silicon pixel detectors. Nuclear Instruments & Methods in Physics Research Section a-Accelerators Spectrometers Detectors and Associated Equipment 2002, 487 (1-2), 113-122.

Springer, M., et al., The distribution of products of independent random variables. SIAM Journal on Applied Mathematics 1966, 14 (3), 511-526.

Coldwell, R., et al., Fractional counts—The simulation of low probability events. In Application of Accelerators in Research and Industry, Duggan, J. L.; Morgan, I. L., Eds. 2001; vol. 576, pp. 587-590.

Leydesdorff, L., et al., How can journal impact factors be normalized across fields of science? Journal of the American Society for Information Science and Technology 2013, 64 (1), 96-107.

* cited by examiner

LINEAR FITTING OF MULTI-THRESHOLD COUNTING DATA

CROSS-REFERENCE TO RELATED APPLICATIONS

The present U.S. patent application is related to and claims the priority benefit of U.S. Provisional Patent Application Ser. No. 61/992,197, filed May 12, 2014, the contents of which are hereby incorporated by reference in its entirety into this disclosure.

STATEMENT OF GOVERNMENT INTEREST

This invention was made with government support under DE-AC02-06CH11357 awarded by the Department of Energy, GM103401 awarded by the National Institutes of Health, and GM106484 awarded by the National Institutes of Health. The government has certain rights in the invention.

TECHNICAL FIELD

The present disclosure generally relates to X-ray imaging, and in particular to a method for mining multi-threshold measurements acquired using photon counting pixel-array detectors for spectral imaging and diffraction analyses.

BACKGROUND

This section introduces aspects that may help facilitate a better understanding of the disclosure. Accordingly, these statements are to be read in this light and are not to be understood as admissions about what is or is not prior art.

Energy-selective X-ray imaging holds great promise at addressing major challenges in X-ray imaging and diffraction. Laue diffraction requires broad-bandwidth X-ray sources and energy assignments for each measured diffraction spot. While this assignment is currently performed by analysis of the total diffraction pattern, improvements in assignments could be enabled through independent measurements of X-ray energies. In materials analysis, the transmittance of X-rays through different materials may be highly sensitive to the X-ray wavelength, particularly at wavelengths close to spectral band-edges. Consequently, spectral X-ray imaging provides contrast intimately connected to composition for materials analysis and biomedical applications.

Particularly in imaging applications with massively parallel detection, multi-threshold photon counting strikes a reasonable cost-benefit balance between the technical requirements to record and store the raw sensor data and the inherent information content it provides. However, accurately relating the measured counts back to X-ray photon energy remains challenging. In most current systems, pixels do have adjustable thresholds, but the voltage peak height distribution is nontrivial due to several factors. These include pixel-to-pixel variance in performance, photon counting paralysis at high count rates, and the spread in the photoelectron plume over multiple pixels. Consequently, the simplest approach of setting a threshold to detect one and not the other X-ray photon energy may be subject to significant errors.

Given the many practical challenges historically associated with spectral X-ray imaging, there is an unmet need for improvements in spectral X-ray imaging.

SUMMARY

In one aspect, the present invention is related to a method for achieving high dynamic range detection based on multi-threshold photon counting. The method involves the steps of acquiring a detector response, modeling the detector response to result in a modeled detector response, fitting the modeled detector response on a pixel-by-pixel basis to acquire a plurality of information for the detector response, generating composite images from the plurality of information for the detector response, and separating composite images into individual contributions from different X-ray energies by fast linear fitting. The detector response comprising counts detected upon absorption of photons by a sensor. Analytical expressions are used for measured peak height distribution and implementation of fractional photon counting.

In another aspect, the present invention is related to a method for mining multi-threshold measurements acquired using photon counting pixel-array detectors for spectral imaging and diffraction analyses. The method involves the steps of modeling a Gaussian random noise per photon. The modeling is based on a plurality of parameters, including a plurality of pixels, an amount of charge sharing occurring between the plurality of pixels, and a point spread occurring between the plurality of pixels. Also involved is the step of determining a most likely number of observed photons, wherein a plurality of counts at each threshold and a number of expected signal distributions per photon are utilized to allow mining multi-threshold measurements acquired using photon counting pixel-array detectors for spectral imaging and diffraction analyses. The combination of the plurality of parameters describes a distribution of signal expected from any one of the plurality of photons or combinations of the plurality of photons.

In another aspect, a system for mining multi-threshold measurements acquired using photon counting pixel-array detectors for spectral imaging and diffraction analyses is disclosed. The system has a photon counting pixel-array detector and a computing device. The computing device is configured to receive input from the photon counting pixel-array detector. The computing device is configured to model random noise per photon.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

In response to the unmet need, presented herein are a novel system and method for mining multi-threshold measurements acquired using photon counting pixel-array detectors for spectral imaging and diffraction analyses. As used herein, the terms pixel-array detector, pixel detector, and photon counting detector are used interchangeably. The system and method disclosed herein have the potential to be addressed in whole or in part through the development of photon-counting array detectors, in which a programmable counting threshold provides a means of performing energy-specific imaging. In particular, a linear fitting approach is presented for spectral detection, in which the counts measured for many thresholds are combined in the analysis. The disclosed approach contributes to efforts for high dynamic range detection based on multi-threshold photon counting by taking advantage of the inherent statistics of the measurement. In the present disclosure, the detector response is modeled and fit on a pixel-by-pixel basis using analytical expressions for the measured peak height distribution and implementation of fractional photon counting. Once established, the information acquired from such modeling and fitting can in turn be used to separate composite images into individual contributions from different X-ray energies by fast linear fitting.

Figure 1:
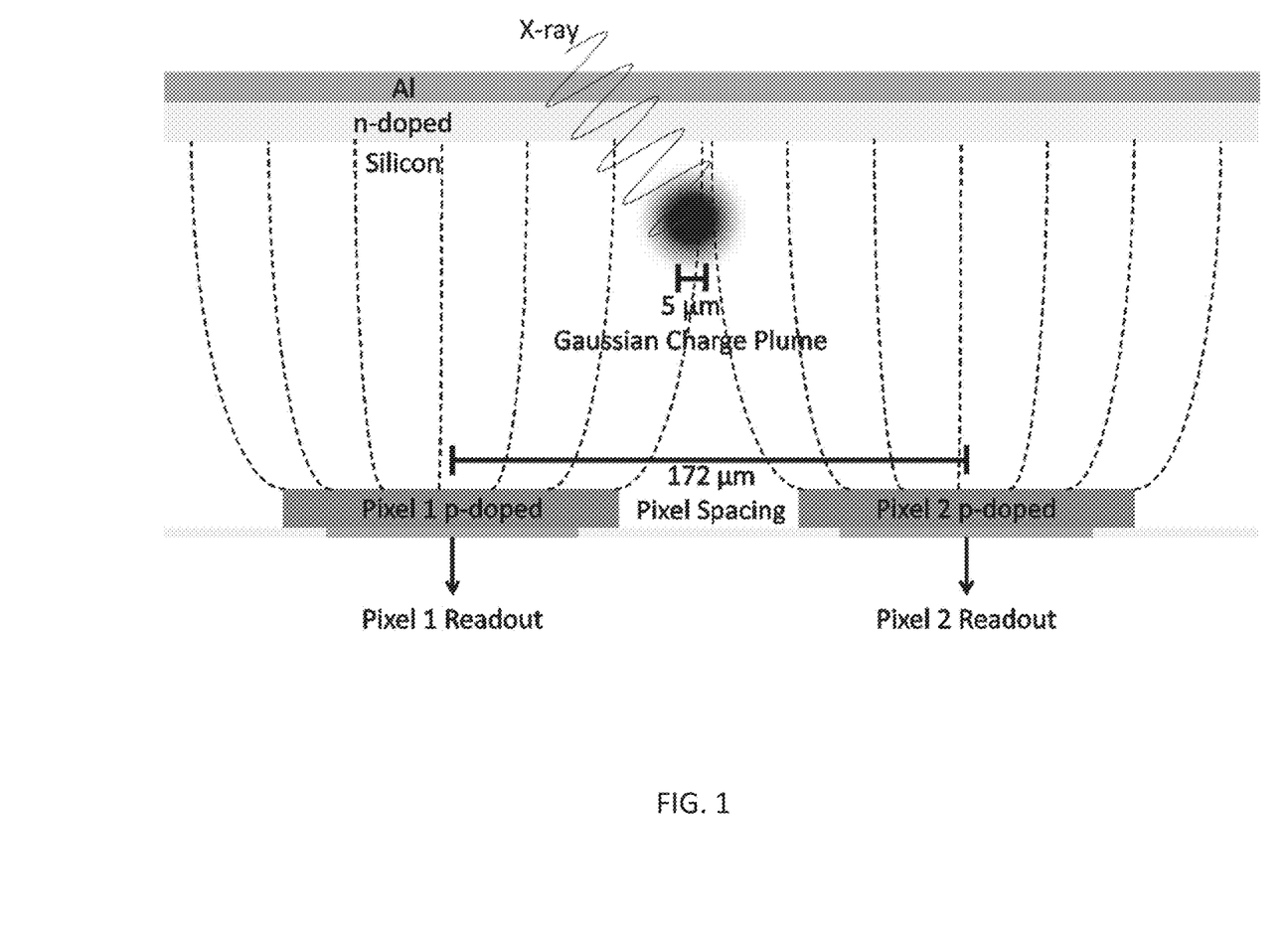
FIG. 1 is a diagram illustrating the X-ray sensing mechanism of a pixel detector.

Methods:

FIG. 1 is a model illustrating the X-ray sensing mechanism of a pixel detector. There is no dead space in the $SiO_2$ detector, causing the charge plume deposited by an X-ray photon to at times be fractionally detected across several charge-collecting pixels. Diffuse scattering of vitreous ice was measured with a pixel detector at several detector threshold levels. Five second exposure times were taken at each detector threshold for both 13.5 keV and 15 keV incident X-ray energies in a standard lattice (153 ns between X-ray pulses). Absolute detector voltage thresholds at each pixel were automatically calibrated through the pixel detector's automatic internal voltage trim system to maintain threshold accuracy. A low gain input amplifier setting was used for all measurements. The resulting internal voltage threshold levels are denoted herein as equivalent thresholds in units of keV, which describes the equivalent X-ray energy that would deposit this mean level of voltage. The 13.5 keV incident energy measurements were taken with equivalent threshold energies from 7.5 keV to 21.0 keV in steps of 0.5 keV with a detector distance of 0.700 m. The 15 keV incident energy measurements were taken on a later day with a new ice sample with equivalent threshold energies from 7.5 keV to 20.9 keV in steps of 0.2 keV with a detector distance of 1.000 m. In all cases, the incident photon flux was kept low enough to ensure a low probability of pulse pileup affecting counting results.

All data analysis was performed in MATLAB with custom software. Data files were read using the MATLAB macros package for cSAXS (Paul Scherrer Institute). ImageJ was also used to view data files using a plugin (CBF reader plugin, written by JLM).

Results and Discussion:

An analytical model for the peak-height distribution as a function of threshold setting was developed based on the assumption of a 2D Gaussian spatial distribution in charge following X-ray absorption, which is consistent with previous models and simulations. The distribution has two contributions; one from X-rays in which the large majority of the plume lies within the area of a single detector pixel and another from plumes spreading over two or more pixels. In previous treatments, efforts to address the issue of charge distribution over multiple pixels have included setting the counting threshold equal to roughly half the mean voltage obtained from the plume centered on a pixel, such that only the pixel with the majority of charge would register a count. While reasonably successful in applications focused on detection alone, this approach becomes untenable for applications targeting energy discrimination, in which the mean voltage of a centered plume is also a variable in the analysis. Even in monochromatic X-ray detection, the half-maximum threshold approach may result in bias from corner effects, in which the plume is distributed over more than two pixels. As the dimensions of the array elements continue to be reduced in size, such effects are likely to become increasingly important.

The fraction of charge expected to be observed by a single pixel from any photon hitting on or near the pixel surface due to this plume effect may be described by the 2D surface integral across the x and y spatial coordinates of the silicon area above the pixel surface. For a pixel of width w, height h, and a boundary distance of consideration b for photons hitting near the pixel active area, this surface integral and its solution is given in Eq. (1):

$$F(x,y) = \int_b^{b+w}\int_b^{b+h}\frac{1}{2\pi\sigma_{psf}^2}\exp\left(\frac{-(x-\mu_x)^2}{2\sigma_{psf}^2}\right)\exp\left(\frac{-(y-\mu_y)^2}{2\sigma_{psf}^2}\right)dxdy = \quad (1)$$

$$\frac{1}{4}\left(\text{erf}\left(\frac{b+w-\mu_x}{\sigma_{psf}\sqrt{2}}\right)-\text{erf}\left(\frac{b-\mu_x}{\sigma_{psf}\sqrt{2}}\right)\right)$$

$$\left(\text{erf}\left(\frac{b+h-\mu_y}{\sigma_{psf}\sqrt{2}}\right)-\text{erf}\left(\frac{b-\mu_y}{\sigma_{psf}\sqrt{2}}\right)\right)$$

The solution in Eq. 1 gives the fraction of charge F expected to be observed from a photon landing at point $(\mu_x,\mu_y)$ with a Gaussian standard deviation plume of uncertainty of $\sigma_{psf}$. Assuming a uniform X-ray intensity field over the pixel surface from a monochromatic light source, a probability density function of fractional contributions may be obtained by Monte-Carlo simulation.

The peak height of the voltage transient observed by the threshold counting electronics from a 100% contribution of a single photon's charge is proportional to the energy of the incident X-ray photon, and has a normally distributed peak current/voltage. For fractional contributions of photon energy, the fractional contribution multiplicatively weights the photon's energy contribution. The resulting probability density function (PDF) of voltage peak heights is then described by a multiplication of random variables, where a random weight is applied to a voltage of normal uncertainty. The resulting overall probability density function for the amount of voltage observed by the counting electronics from any direct or proximal X-ray photon strike may be obtained by Monte-Carlo simulation or derived numerically using the product distribution integral. Generally stated, for Z=XY where X and Y are two independent random variables with PDFs $f_x$ and $f_y$, the PDF of the product $f_z$ is given by Eq. (2).

$$f_Z(z) = \int_{-\infty}^{\infty} f_X(x) f_Y\left(\frac{z}{x}\right) \frac{1}{|x|} dx \quad (2)$$

Figure 2A:
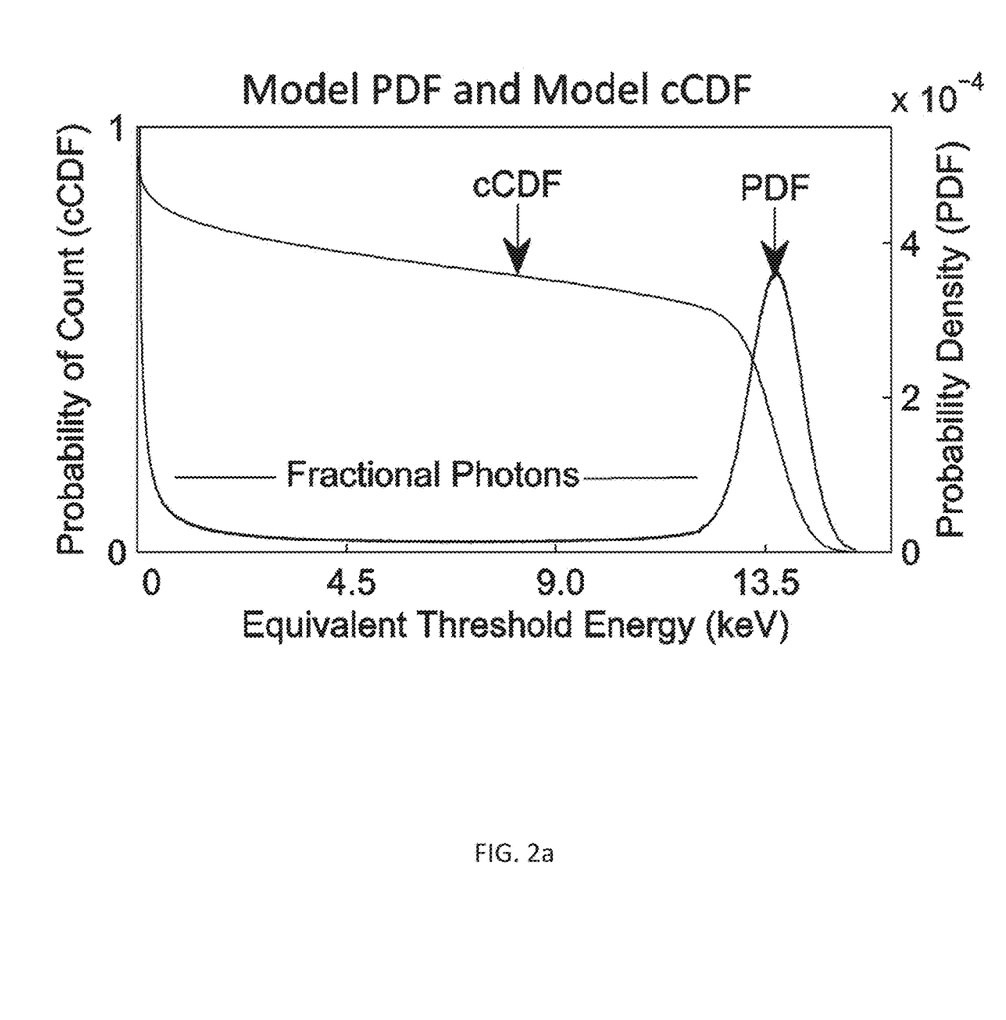
FIG. 2a is a probability density function of the amount of equivalent charge observed by a single pixel from a single 13.5 keV X-ray photon.
Figure 2B:
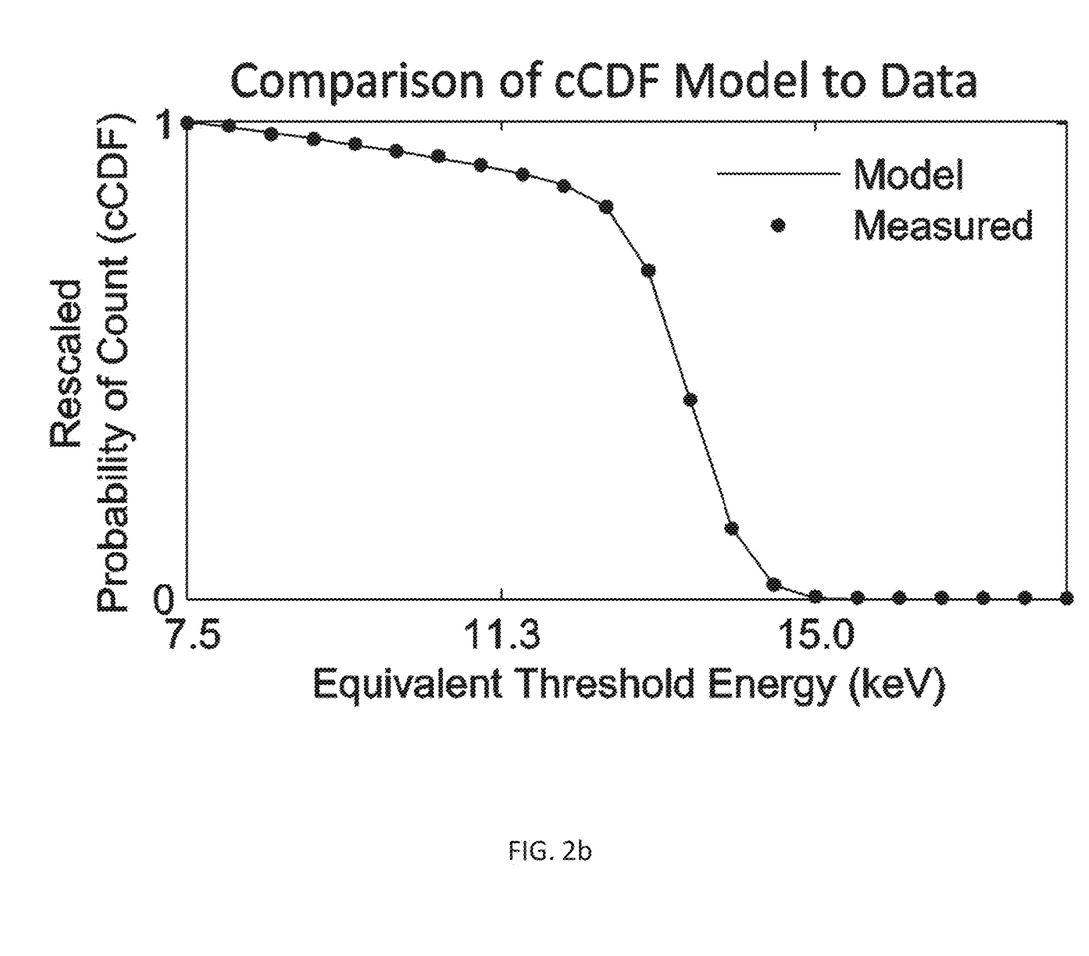
FIG. 2b is a complimentary CDF (cCDF) of the amount of equivalent charge observed by a single pixel from a single 13.5 keV X-ray photon.

A representative peak height distribution is shown in FIGS. 2a and 2b, along with the complimentary cumulative density function (cCDF) corresponding to the anticipated measured probability of observing a count for a photon absorption event. FIG. 2a depicts the PDF and complimentary CDF (cCDF) of the amount of equivalent charge observed by a single pixel from a single 13.5 keV X-ray photon. Referring to FIG. 2a, the Gaussian hump on the right of the PDF represents collection of the full deposited charge following X-ray absorption, and all probabilities to the left of this hump represent fractional observations of the X-ray deposited charge plume. This distribution has a total of three parameters, with the photon energy standard deviation and photon energy mean describing the position and width of the Gaussian hump, and the size of the point spread affecting the depth of the trough to the left of the Gaussian hump. Referring to FIG. 2b, the cCDF was directly measured by the pixel detector from a 13.5 keV monochromatic source at many equivalent threshold energy levels from 7.5 keV to 21 keV. After averaging all pixel responses at every threshold, the data were fit to the model cCDF with excellent agreement. The model is also shown to be in good agreement with experimentally acquired data compared to the mean detector response averaged across all pixels for many measurement thresholds. The novel utility of this approach is that rather than satisfying the default intuition that each photon should be counted once as a full contribution, the unbiased intensity may be recovered by allowing for fractional photon counting, in which the fraction of the photon at that pixel is included in the measured PDF and cCDF. Further, signal contributions from photon strikes near pixel corners that were previously lost by setting the threshold to the equivalent of 50% of the incident photon energy may be now be properly accounted for by knowledge of the cCDF. The corresponding signal/noise increase will be particularly advantageous for counting arrays with small pixel sizes, which exhibit corresponding increases in the probability of the electron plume spreading over multiple pixels.

Figure 3:
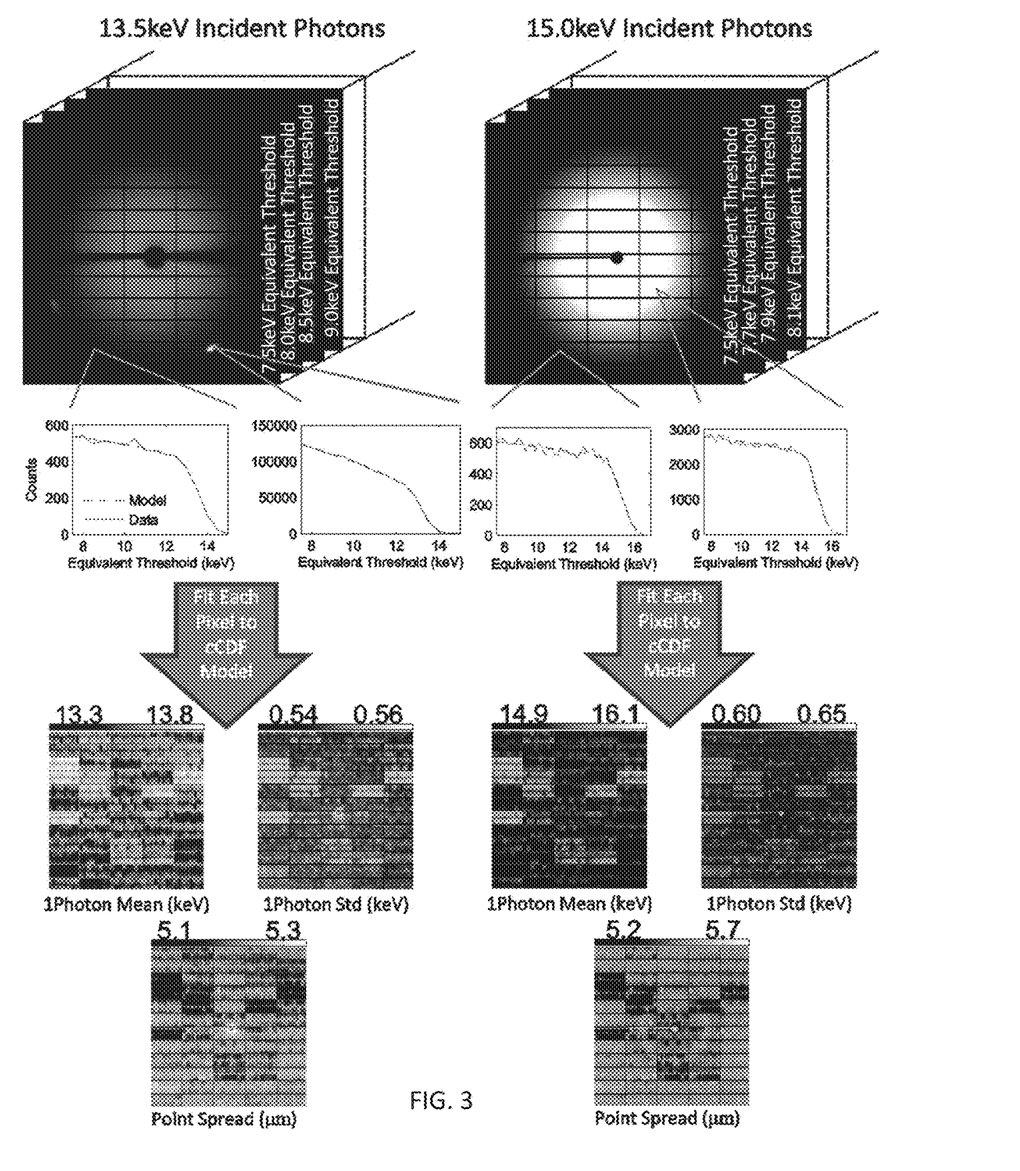
FIG. 3 is a series of images of diffuse X-ray scattering of monochromic 13.5 keV and 15.0 keV from ice at several equivalent detector threshold levels from 7.5 keV to 21 keV; two representative pixels are chosen from each image stack for displaying in a plot along with their fit to the cCDF model.

The counts were detected as a function of threshold for every pixel in a 6 megapixel array detector, and nonlinear fits were performed for each pixel to determine best-fit values of $\mu_{1p}$, $\sigma_{1p}$, and $\sigma_{psf}$, representative results of which are provided in FIG. 3. Referring to the top of FIG. 3, images of diffuse X-ray scattering of monochromic 13.5 keV and 15.0 keV from ice are shown at several equivalent detector threshold levels from 7.5 keV to 21 keV. Two representative pixels were chosen from each image stack for displaying in a plot along with their fit to the cCDF model. Referring to the bottom of FIG. 3, each of the approximately 6 million pixels were independently fitted to the cCDF model, with the 3 parameters of the fit displayed as images. These pixel-specific parameters define the instrument response of each pixel to each color. Raw data consisted of a stack of images of the counts acquired under different threshold settings from a diffusely scattering sample of vitreous ice. After performing the fitting, the best-fit values from each pixel were representable by a set of 3 images of the fitting parameters, also shown in FIG. 3. The nonlinear fits recovered the experimental cCDFs remarkably well, although with a significant diversity in the fitting parameters across the array. This process was repeated for both 13.5 keV and 15.0 keV X-ray energies.

Following calibration, the measured counts as a function of threshold can serve as a "hyperspectral" signature to separate out the multi-threshold image stack into independent images at each X-ray energy through simple linear fitting. In brief, the measured cCDF "spectrum" may be written as a linear combination of the cCDFs for the 13.5 keV and the 15.0 keV sources according to Eq. (3):

$$cCDF_{meas}(V_{th}) = a_1 \cdot cCDF_{13.5}(V_{th}) + a_2 \cdot cCDF_{15.0}(V_{th}) \quad (3)$$

In Eq. (2), the measured cCDF is expressed as a linear combination of two other cCDFs, and their amplitude weights $a_1$ and $a_2$ are the parameters of the linear fit. This expression may be rewritten in matrix form by defining C to be a matrix of cCDF "spectra", then inverted to solve for the best-fit values of the parameters a. Images of each coefficient correspond to the best-fit estimates of each separated X-ray energy image.

$$c_{meas} = C \cdot a \quad (4)$$

$$a = (C^T C)^{-1} C^T c_{meas} \quad (5)$$

Because the matrix C is known in advance following the initial nonlinear fitting calibration step, the combined inverse and transpose matrix may also be determined a priori. In the present case of discrimination between two known energies, $[(C^T C)^{-1} C^T]$ is a 2×n matrix, where n is the number of thresholds used to generate $c_{meas}$.

Figure 4:
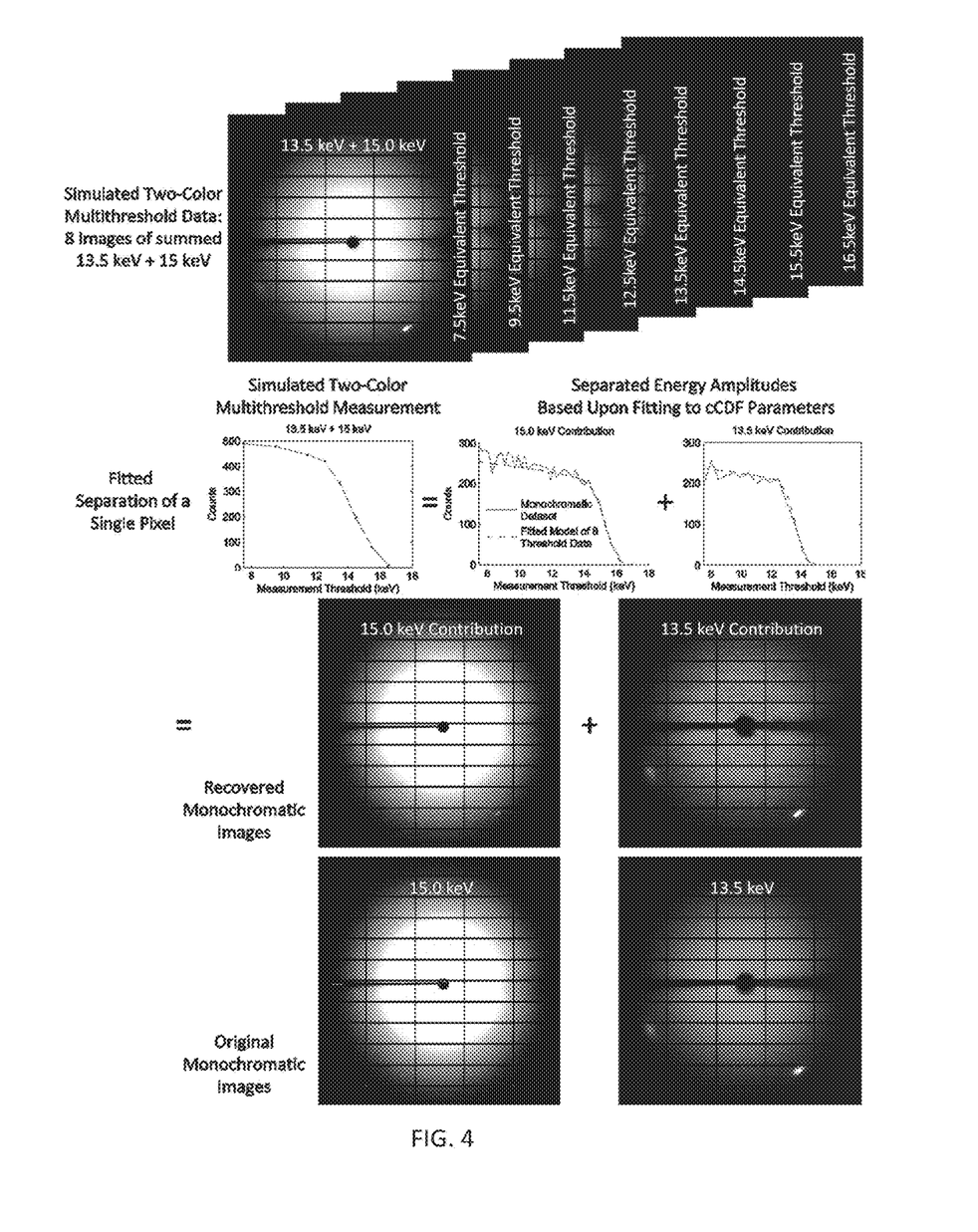
FIG. 4 is a series of images illustrating the experimental validation of the algorithm, which was performed by separating a composite image generated by summation of the counts acquired at 13.5 keV and 15.0 keV.

Experimental validation of the algorithm was performed by separating a composite image generated by summation of the counts acquired at 13.5 keV and 15.0 keV, shown in FIG. 4. Referring to the top image stack of FIG. 4, multithreshold measurement of two color diffraction was simulated by summing the 13.5 keV and 15 keV diffraction image stacks at eight different matching measurement thresholds. Referring to the middle plots in FIG. 4, The three parameters previously recovered for each color (FIG. 3) was used to re-separate the number of counts contributed by each of the two colors, demonstrated here for a single pixel. Referring to the bottom images of FIG. 4, the fit was repeated for all pixels and shown in the top row of images. Comparison against the original monochromatic dataset shows good agreement. The monochromatic images were recovered using counting data from just 8 of the acquired threshold data. The target of eight thresholds was selected based on the potential ease of acquisition. Assuming two independently adjustable thresholds per pixel, eight-threshold detection could be accomplished by pooling 2×2 pixel spots. Using Eq. 4 the best-fit component images were recovered. In general, the number of unique parameters related to the photon energy must be equal or lesser than the number of thresholds used to extract them. Further, the confidence in the values obtained from the fits will increase as the number of information-carrying threshold measurements increases. Although Eq. 5 is cast with respect to detection of two monochromatic responses for simplicity, the approach would work comparably well for linear functions of those responses (e.g., derived from principal component analysis or linear discriminant analysis).

Figure 5:
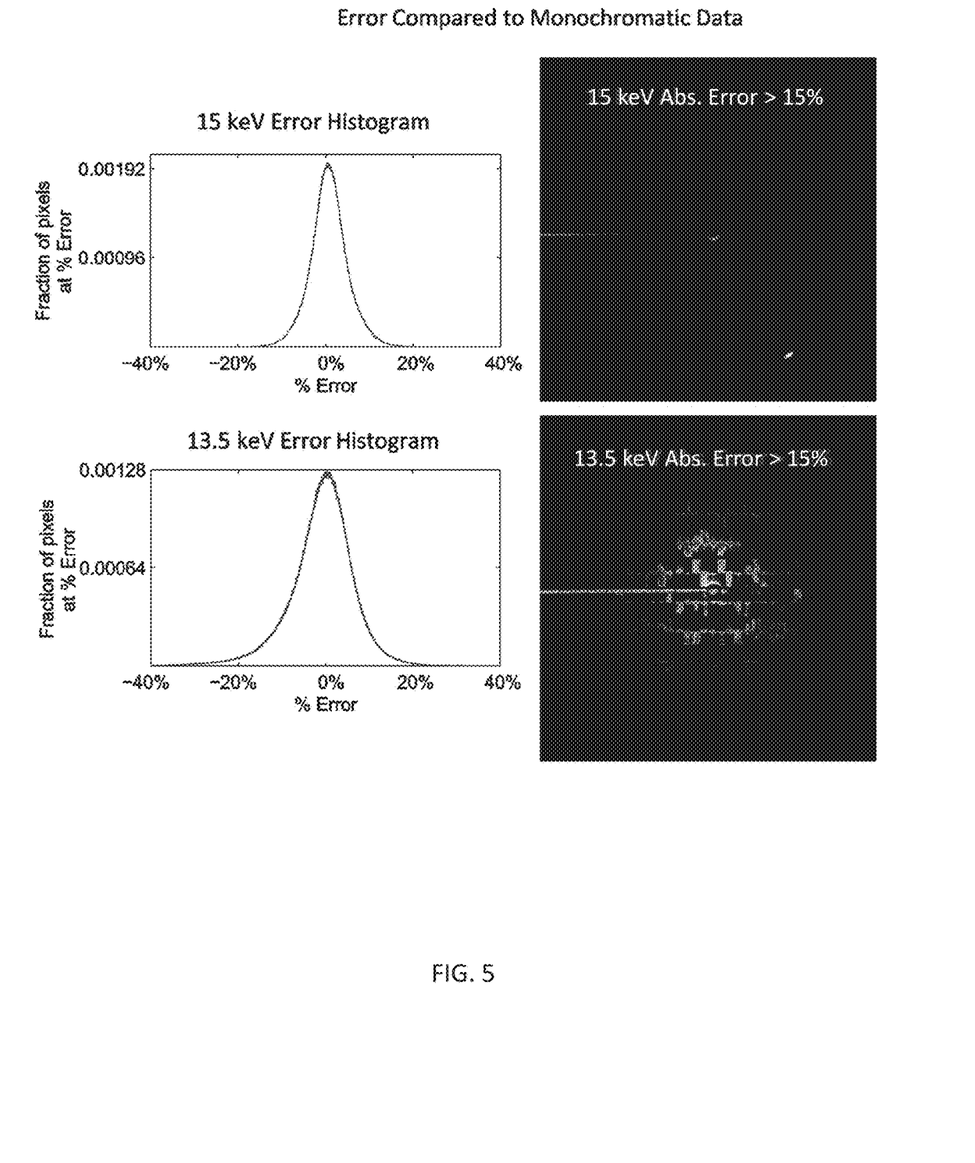
FIG. 5 is a diagram showing quantitative assessment of the error of the fitted values compared to the original monochromatic dataset.

Overall, the recovered images were in good agreement with the initial monochromatic images, as indicated in the error analysis shown in FIG. 5. All but a small fraction of the pixels recovered the correct amplitudes of the original monochromatic images to within 20% accuracy for a photon energy separation of just 11%. Pixels out of 15% tolerance in absolute accuracy are indicated in images to the right in FIG. 5. Referring to FIG. 5, quantitative assessment of the error of the fitted values compared to the original monochromatic dataset is depicted. 1/f noise associated with about 2 minutes between threshold measurements contributes the majority of the error in this fitting, which would be substantially reduced by simultaneous acquisition of all measurement thresholds. Even with this noise present, the vast majority of all pixels are within 20% of their original monochromatic dataset values. Pixels that contain more than 15% absolute error were those subject to multiplex disadvantage (the color that contributes the most signal also contributes the most noise). Comparing the error images with the monochromatic images in FIG. 4 suggests that the multiplex disadvantage is the major source of error in the decomposed images. In brief, pixels with high brightness in one monochromatic image will introduce Poisson counting uncertainty proportional to the square root of the number of photons counted. This noise will be distributed over both extracted images, potentially increasing the noise in the separated channel to a value significantly greater than the square root of the number of counts. From inspection of FIG. 4, the bright diffraction spot from the 13.5 keV contribution in the bottom right generated substantial noise in the 15 keV image, and vice versa for the bright halo in the center of the 15 keV contribution.

Inspection of the parameter images in FIG. 3 reveals several interesting trends. First, there is considerable diversity in the best-fit values of $\mu_{1p}$, $\sigma_{1p}$, and $\sigma_{psf}$ as a function of location across the detector array. Notably, there appears to be a significant anti-correlation between the mean voltage expected for a one-photon absorption event and the corresponding standard deviation in the point-spread function. This inter-dependence is somewhat surprising, as maximization of the one-photon mean voltage and minimization of the point-spread function standard deviation are both mutually advantageous for S/N enhancement, rather than representing design trade-offs between the two criteria. The correlation between $\mu_{1p}$ and $\sigma_{1p}$ is easier to rationalize. Assuming a constant relative standard deviation, the absolute standard deviation should scale with the mean. Interestingly, however, there are several anti-correlated regions with low means and relatively high standard deviations for both $\sigma_{1p}$, and $\sigma_{psf}$, presumably representing sections of the array with underperforming pixels (e.g., lower left corner). Overall, the values obtained from the fitting at 13.5 keV agreed qualitatively well with those produced independently from the 15.0 keV data, indicating good reproducibility in the fitting approach. This agreement is particularly noteworthy given the large differences in the X-ray intensity measured across the array, indicating that the detector analysis may be reliably performed largely independently of detected intensity, provided a sufficient number of counts are recorded at each location to perform the nonlinear fitting.

Although the focus of this disclosure is on discrimination between two known energies, the consistency in the extracted array parameters from the nonlinear fits suggests that reasonable estimates for the anticipated parameters at intermediate photon energies may be obtained by interpolation. In this manner, calibration of the array using a relatively small number of judiciously selected photon energies could serve to enable analysis at arbitrary energies within the calibration window. With the exception of sharp features associated with absorption edges (e.g., the K edge in Si around 2 keV), the X-ray responsivity of silicon photodiodes varies smoothly with photon energy.

Analysis of the raw multi-threshold data is consistent with 1/f noise as the dominant noise source in the treatment. Inspection of the cCDF measurements acquired at adjacent pixels produced similar noise features, suggesting slow drift in the overall detector array over time rather than dominance from white Gaussian noise. This is actually a favorable condition for two reasons. First, the 1/f drift was sufficiently low to still allow complete analysis of the array. Second, the next generation of pixel-array detectors is designed to enable rapid toggling between two independent thresholds per pixel, or assign eight independent thresholds for a 2×2 section.[28] Simultaneous acquisition of all the multi-threshold data will substantially reduce the 1/f noise contributions that dominate in the current study, with corresponding improvements in the confidence in energy assignment.

The present analysis was performed on a pixel-by-pixel basis, with no incorporation of the overall pattern of intensities or image analysis. Significant further improvements in the energy discrimination capabilities may emerge from additional consideration of spatial arrangements. In diffraction analysis, Laue diffraction can provide independent assessment of the X-ray photon energy through the pattern of observed diffraction peaks. In X-ray imaging, the object resulting in image contrast typically contains rich additional information accessible through a host of different image analysis algorithms. Even more simply, the detected intensity at adjacent pixels is not likely to be dramatically different, suggesting that smoothing functions may further improve separation in low signal to noise channels. These options are all beyond the scope of the present study, focused exclusively on mapping the per-pixel detector response. However, they could be integrated into application-specific measurements incorporating multi-threshold imaging detection with pixel-array detectors.

Analytical models for the peak height distribution combined with fractional photon counting allowed accurate recovery of the measured counts as a function of discriminator threshold, from which monochromatic X-ray images could be independently recovered from a single combined dual-wavelength image. Fitting to determine the detector response at each wavelength was performed on a per-pixel basis, with the resulting best-fit parameters stored as a combination of three images. Inversion to recover the relative contributions of each individual wavelength in the composite image could be done by simple matrix multiplication. In general, the intensities of the pixels recovered from the fitting were in excellent quantitative agreement with the intensities within the initial monochromatic images. However, in pixels with bright signals at one wavelength and weak signals in the other, the multiplex disadvantage was found to reduce the S/N of the weak signal relative to the corresponding monochromatic image.

This combined analysis was performed entirely on a pixel-by-pixel basis, with opportunities for significant improvements through additional knowledge of the spatial arrangements between the different X-ray energies. In the case of Laue diffraction, for example, it is expected that each detected diffraction peak will likely be locally monochromatic, such that the spectral assignment problem is simplified to selecting the most probably X-ray energy. Alternatively in biomedical imaging applications, a whole host of image processing algorithms for hyperspectral imaging could be considered for improving the quality of both the underlying X-ray image and the confidence in the corresponding energy assignments as a function of location.

Those skilled in the art will recognize that numerous modifications can be made to the specific implementations described above. The implementations should not be limited to the particular limitations described. Other implementations may be possible.

Literature Cited

Each of the following references and all other references cited in this application is hereby incorporated by reference in its entirety as if individually incorporated by reference and fully set forth.

1. von Laue, M., Concerning the Detection of X-Ray Interferences. Nobel Lecture: 1915.
2. Schlichting, I.; Almo, S. C.; Rapp, G.; Wilson, K.; Petratos, K.; Lentfer, A.; Wittinghofer, A.; Kabsch, W.; Pai, E. F.; Petsko, G. A.; Goody, R. S., Time-Resolved X-Ray Crystallographic Study of the Conformational Change in HA-Ras P21 Protein on GTP Hydrolysis. *Nature* 1990, 345 (6273), 309-315.
3. Clifton, I. J.; Duke, E. M. H.; Wakatsuki, S.; Ren, Z., Evaluation of Laue diffraction patterns. In *Macromolecular Crystallography, Pt B*, Carter, C. W.; Sweet, R. M., Eds. 1997; Vol. 277, pp 448-467.
4. Srajer, V.; Teng, T. Y.; Ursby, T.; Pradervand, C.; Ren, Z.; Adachi, S.; Schildkamp, W.; Bourgeois, D.; Wulff, M.; Moffat, K., Photolysis of the carbon monoxide complex of myoglobin: Nanosecond time-resolved crystallography. *Science* 1996, 274 (5293), 1726-1729.
5. Frojdh, C.; Norlin, B.; Frojdh, E., Spectral X-ray imaging with single photon processing detectors. *Journal of Instrumentation* 2013, 8.
6. Nik, S. J.; Meyer, J.; Watts, R., Optimal material discrimination using spectral x-ray imaging. *Physics in Medicine and Biology* 2011, 56 (18), 5969-5983.
7. Jakubek, J., Data processing and image reconstruction methods for pixel detectors. *Nuclear Instruments & Methods in Physics Research Section a—Accelerators Spectrometers Detectors and Associated Equipment* 2007, 576 (1), 223-234.
8. Roessl, E.; Proksa, R., K-edge imaging in x-ray computed tomography using multi-bin photon counting detectors. *Physics in Medicine and Biology* 2007, 52 (15), 4679-4696.
9. Fredenberg, E.; Lundqvist, M.; Cederstrom, B.; Aslund, M.; Danielsson, M., Energy resolution of a photon-counting silicon strip detector. *Nuclear Instruments & Methods in Physics Research Section a—Accelerators Spectrometers Detectors and Associated Equipment* 2010, 613 (1), 156-162.
10. Boone, J. M.; Shaber, G. S.; Tecotzky, M., Dual-Energy Mammography—A Detector Analysis *Medical Physics* 1990, 17 (4), 665-675.
11. Butler, A. P. H.; Anderson, N. G.; Tipples, R.; Cook, N.; Watts, R.; Meyer, J.; Bell, A. J.; Melzer, T. R.; Butler, P. H., Bio-medical X-ray imaging with spectroscopic pixel detectors. *Nuclear Instruments & Methods in Physics Research Section a—Accelerators Spectrometers Detectors and Associated Equipment* 2008, 591 (1), 141-146.
12. Procz, S.; Lubke, J.; Zwerger, A.; Mix, M.; Fiederle, M., Optimization of Medipix-2 Threshold Masks for Spectroscopic X-Ray Imaging. *Ieee Transactions on Nuclear Science* 2009, 56 (4), 1795-1799.
13. Llopart, X.; Campbell, M.; Dinapoli, R.; Segundo, D. S.; Pemigotti, E., Medipix2: a 64-k pixel readout chip with 55 mu m square elements working in single photon counting mode. *Ieee Transactions on Nuclear Science* 2002, 49 (5), 2279-2283.
14. Ballabriga, R.; Campbell, M.; Heijne, E. H. M.; Llopart, X.; Tlustos, L., The medipix3 prototype, a pixel readout chip working in single photon counting mode with improved spectrometric performance. *Ieee Transactions on Nuclear Science* 2007, 54 (5), 1824-1829.
15. Broennimann, C.; Eikenberry, E. F.; Henrich, B.; Horisberger, R.; Huelsen, G.; Pohl, E.; Schmitt, B.; Schulze-Briese, C.; Suzuki, M.; Tomizaki, T.; Toyokawa, H.; Wagner, A., The PILATUS 1M detector. *Journal of Synchrotron Radiation* 2006, 13, 120-130.
16. Henrich, B.; Bergamaschi, A.; Broennimann, C.; Dinapoli, R.; Eikenberry, E. F.; Johnson, I.; Kobas, M.; Kraft, P.; Mozzanica, A.; Schmitt, B., PILATUS: A single photon counting pixel detector for X-ray applications. *Nuclear Instruments & Methods in Physics Research Section a—Accelerators Spectrometers Detectors and Associated Equipment* 2009, 607 (1), 247-249.
17. Llopart, X.; Ballabriga, R.; Campbell, M.; Tlustos, L.; Wong, W., Timepix, a 65 k programmable pixel readout chip for arrival time, energy and/or photon counting measurements. *Nuclear Instruments & Methods in Physics Research Section a—Accelerators Spectrometers Detectors and Associated Equipment* 2007, 581 (1-2), 485-494.
18. Kraft, P.; Bergamaschi, A.; Bronnimann, C.; Dinapoli, R.; Eikenberry, E. F.; Graafsma, H.; Henrich, B.; Johnson, I.; Kobas, M.; Mozzanica, A.; Schleputz, C. A.; Schmitt, B., Characterization and Calibration of PILATUS Detectors. *Ieee Transactions on Nuclear Science* 2009, 56 (3), 758-764.
19. Kissick, D. J.; Muir, R. D.; Simpson, G. J., Statistical Treatment of Photon/Electron Counting: Extending the Linear Dynamic Range from the Dark Count Rate to Saturation. *Analytical Chemistry* 2010, 82 (24), 10129-10134.
20. Julien, M.; Kadda, M., Detective quantum efficiency model of single-X-ray-photon counting hybrid pixel detectors. *Journal of Instrumentation* 2012, 7 (11), P11028.
21. Trueb, P.; Sobott, B. A.; Schnyder, R.; Loeliger, T.; Schneebeli, M.; Kobas, M.; Rassool, R. P.; Peake, D. J.; Broennimann, C., Improved count rate corrections for highest data quality with PILATUS detectors. *Journal of Synchrotron Radiation* 2012, 19, 347-351.
22. Mathieson, K.; Passmore, M. S.; Seller, P.; Prydderch, M. L.; O'Shea, V.; Bates, R. L.; Smith, K. M.; Rahman, M., Charge sharing in silicon pixel detectors. *Nuclear Instruments & Methods in Physics Research Section a—Accelerators Spectrometers Detectors and Associated Equipment* 2002, 487 (1-2), 113-122.
23. Springer, M.; Thompson, W., The distribution of products of independent random variables. *SIAM Journal on Applied Mathematics* 1966, 14 (3), 511-526.
24. Coldwell, R. L.; Lasche, G. P.; Jadczyk, A., Fractional counts—The simulation of low probability events. In *Application of Accelerators in Research and Industry*, Duggan, J. L.; Morgan, I. L., Eds. 2001; Vol. 576, pp 587-590.
25. Burrell, Q.; Rousseau, R., Fractional Counts for Authorship Attribution—A Numerical Study. *Journal of the American Society for Information Science* 1995, 46 (2), 97-102.
26. Leydesdorff, L.; Zhou, P.; Bornmann, L., How can journal impact factors be normalized across fields of science? An assessment in terms of percentile ranks and fractional counts. *Journal of the American Society for Information Science and Technology* 2013, 64 (1), 96-107.

27. Fraser, G. W.; Abbey, A. F.; Holland, A.; McCarthy, K.; Owens, A.; Wells, A., The X-Ray-Energy Response of Silicon. A. Theory. *Nuclear Instruments & Methods in Physics Research Section a—Accelerators Spectrometers Detectors and Associated Equipment* 1994, 350 (1-2), 368-378.

28. Wong, W. In *Design considerations for area-constrained in-pixel photon counting in Medipix3*, Topical workshop on Electronics for Particle Physics, 2008; pp 539-543.

The invention claimed is:

1. A method for achieving dynamic range detection in X-ray image processing, the method comprising:
    acquiring a sensor response based on a plurality of X-ray photons from a sensor, the sensor response comprising a plurality of counts, wherein each count of the plurality of counts comprises an X-ray photon induced transient voltage that exceeds a local set of predetermined voltages, wherein a global set of predetermined voltages comprises the local set of predetermined voltages;
    modeling a peak height distribution, using a functional form, for a plurality of single photon responses from a histogram of the X-ray photon induced transient voltage;
    calculating a second peak height distribution for a plurality of simultaneous photons based on the plurality of single photon response and the peak height distribution;
    performing Poisson weighting on the peak height distribution and the second peak height distribution, thereby generating a Poisson weighted peak height distribution;
    determining a number of photons using the Poisson weighted peak height distribution; and
    forming an image based on the determined number of photons at each pixel location of the sensor.

2. The method of claim 1, wherein the sensor comprises a pixel array detector, wherein the pixel array detector comprises a plurality of X-ray photon counting electronics at the each pixel location.

3. The method of claim 1, wherein each predetermined voltage of the global set of predetermined voltages are adjustable.

4. The method of claim 1, wherein each predetermined voltage of the local set of predetermined voltages are adjustable.

5. The method of claim 1, wherein the peak height distribution is used to determine energy of each X-ray photon of the plurality of X-ray photons.

6. A method for achieving dynamic range detection in X-ray image processing, the method comprising:
    acquiring a sensor response based on a plurality of X-ray photons from a sensor, the sensor response comprising a plurality of counts, wherein each count of the plurality of counts comprises an X-ray photon induced transient voltage that exceeds a local set of predetermined voltages, wherein a global set of predetermined voltages comprises the local set of predetermined voltages;
    determining a point spread function from the plurality of counts;
    modeling a fractional peak height distribution from the point spread function and a size of a single pixel of the sensor;
    determining a fractional number of photons from the point spread function and the size of the single pixel of the sensor; and
    forming an image based on the determined number of photons at each pixel location of the sensor.

7. The method of claim 6, wherein the determining the point spread function from the plurality of counts comprises determining the point spread function for a charged plume from the plurality of counts, wherein the charged plume is produced by the sensor when the plurality of X-ray photons is absorbed by the sensor.

8. A non-transitory computer-readable medium encoded with a computer-readable program which, when executed by a processor, will cause a computer to execute a method for achieving dynamic range detection in X-ray image processing, the method comprising:
    acquiring a sensor response based on a plurality of X-ray photons from a sensor, the sensor response comprising a plurality of counts, wherein each count of the plurality of counts comprises an X-ray photon induced transient voltage that exceeds a local set of predetermined voltages, wherein a global set of predetermined voltages comprises the local set of predetermined voltages;
    modeling a peak height distribution, using a functional form, for a plurality of single photon responses from a histogram of the X-ray photon induced transient voltage;
    calculating a second peak height distribution for a plurality of simultaneous photons based on the plurality of single photon response and the peak height distribution;
    performing Poisson weighting on the peak height distribution and the second peak height distribution, thereby generating a Poisson weighted peak height distribution;
    determining a number of photons using the Poisson weighted peak height distribution; and
    forming an image based on the determined number of photons at each pixel location of the sensor.

* * * * *